United States Patent
Wang et al.

(10) Patent No.: US 9,467,262 B2
(45) Date of Patent: Oct. 11, 2016

(54) METHOD FOR CONFIGURING REFERENCE SIGNAL, UE, AND ENB

(71) Applicant: HUAWEI TECHNOLOGIES CO., LTD., Shenzhen (CN)

(72) Inventors: Jianguo Wang, Beijing (CN); Xingqing Cheng, Beijing (CN); Yongxing Zhou, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 191 days.

(21) Appl. No.: 14/149,499

(22) Filed: Jan. 7, 2014

(65) Prior Publication Data

US 2014/0119228 A1 May 1, 2014

Related U.S. Application Data

(63) Continuation of application No. PCT/CN2012/077273, filed on Jun. 21, 2012.

(30) Foreign Application Priority Data

Jul. 7, 2011 (CN) .......................... 2011 1 0189881

(51) Int. Cl.
*H04L 12/26* (2006.01)
*H04L 5/00* (2006.01)
(Continued)

(52) U.S. Cl.
CPC ............ *H04L 5/0048* (2013.01); *H04W 24/10* (2013.01); *H04W 16/26* (2013.01); *H04W 84/047* (2013.01)

(58) Field of Classification Search
USPC .......................... 370/241, 252, 328, 329, 500
See application file for complete search history.

(56) References Cited

U.S. PATENT DOCUMENTS

2007/0140168 A1* 6/2007 Laroia ................... H04W 24/08
370/330
2011/0149921 A1* 6/2011 Shin ....................... H04W 16/02
370/336
(Continued)

FOREIGN PATENT DOCUMENTS

CN 101272608 A 9/2008
CN 101714897 A 5/2010
WO WO 2011/079294 A1 6/2011

OTHER PUBLICATIONS

LG Electronics, "Harmonized Proposal for CSI-RS Pattern" 3GPP TSG RAN WG1 Meeting #61b, Dresden, Germany, Jun. 28-Jul. 2, 2010, Agenda Item: 6.3.2.1, 4 pages.
(Continued)

*Primary Examiner* — Kwang B Yao
*Assistant Examiner* — Nguyen Ngo
(74) *Attorney, Agent, or Firm* — Brinks Gilson & Lione (57) ABSTRACT

The present invention provides a method for configuring a reference signal, a UE, and an eNB. The method includes: determining, by a UE, a reference signal configuration priority set, and sending information of the reference signal configuration priority set to an eNB; and receiving, by the UE, a reference signal configuration measurement set sent by the eNB, where the reference signal configuration measurement set is configured by the eNB according to the information of the reference signal configuration priority set, and the reference signal configuration measurement set is used for the UE to measure and feed back channel state information. In embodiments of the present invention, a reference signal configuration matched with an optimal actual channel of a UE can be selected when an RRH or a base station is geographically separated, so that the UE can acquire a good channel condition.

12 Claims, 4 Drawing Sheets

A UE determines a reference signal configuration priority set, and sends information of the reference signal configuration priority set to an eNB — 11

The UE receives a reference signal configuration measurement set sent by the eNB, where the reference signal configuration measurement set is configured by the eNB according to the information of the reference signal configuration priority set, and the reference signal configuration measurement set is used for the UE to measure and feed back channel state information — 12

(51) Int. Cl.
*H04W 24/10* (2009.01)
*H04W 16/26* (2009.01)
*H04W 84/04* (2009.01)

(56) References Cited

U.S. PATENT DOCUMENTS

| | | | | |
|---|---|---|---|---|
| 2012/0051257 A1* | 3/2012 | Kim | ............... | H04B 7/024 370/252 |
| 2012/0250541 A1* | 10/2012 | Ko | ............... | H04L 1/0026 370/252 |
| 2012/0281555 A1* | 11/2012 | Gao | ............... | H04L 1/0031 370/252 |
| 2013/0148536 A1* | 6/2013 | Frenger | ............... | H04L 5/0035 370/252 |
| 2013/0170385 A1* | 7/2013 | Frenger | ............... | H04W 48/20 370/252 |
| 2013/0201913 A1* | 8/2013 | Niemela | ............... | H04L 25/0226 370/328 |
| 2014/0247789 A1* | 9/2014 | Li | ............... | H04L 5/0048 370/329 |
| 2014/0355529 A1* | 12/2014 | Zhu | ............... | H04N 21/2365 370/329 |
| 2015/0215015 A1* | 7/2015 | Chen | ............... | H04L 25/03343 375/267 |

OTHER PUBLICATIONS

Ericsson, "Baseline Schemes and Focus of CoMP Studies" Agenda 6.3.1.2, 3GPP TSG-RAN WG1 #63bis, Dublin, Ireland, Jan. 17-21, 2011, 2 pages.

Lte, "3$^{rd}$ Generation Partnership Project; Technical Specification Group Radio Access Network; Evolved Universal Terrestrial Radio Access (E-UTRA); Requirements for support of radio resource management" (Release 10) 3GPP TS 36.133, V10.3.0, Jun. 2011, 457 pages.

Lte, "3rd Generation Partnership Project; Technical Specification Group Radio Access Network; Evolved Universal Terrestrial Radio Access (E-UTRA); Radio Resource Control (RRC); Protocol Specification" (Release 10) 3GPP TS 36.331, V10.1.0, Mar. 2011, 17 pages.

Ericsson, "Aspects on Distributed RRUs with Shared Cell-ID for Heterogeneous Deployments" Agenda 6.3.1.2, 3GPP TSG-RAN WG1 #64, Taipei, Taiwan, Feb. 21-25, 2011, 11 pages.

Intel Corporation, "CSI-RS configuration/reconfiguration in distributed RRH systems" Agenda Item 6.3.2.2, 3GPP TSG RAN WG1 Meeting #65, Barcelona, Spain, May 9-13, 2011, 3 pages.

RIM UK Limited, "Downlink CSI Feedback for Low-Power Nodes" 3GPP TSG RAN WG1 Meeting #65, Barcelona, Spain, May 9-13, 2011, 6 pages.

Huawei, HiSilicon, "CSI-RS port selection for distributed antennas" Agenda Item 6.6.3, 3GPP TSG RAN WG1#65, Athens, Greece, Aug. 22-26, 2011, 4 pages.

Alcatel-Lucent, "CoMP Operation and UE Mobility", Agenda Item 7.5.3, 3GPP TSG RAN WG1 meeting #68, Dresden, Germany, Feb. 6-10, 2012, 5 pages.

\* cited by examiner

METHOD FOR CONFIGURING REFERENCE SIGNAL, UE, AND ENB

CROSS-REFERENCE TO RELATED APPLICATIONS

This application is a continuation of International Application No. PCT/CN 2012/077273, filed on Jun. 21, 2012, which claims priority to Chinese Patent Application No. 201110189881.2, filed on Jul. 7, 2011, both of which are hereby incorporated by reference in their entireties.

TECHNICAL FIELD

The present invention relates to the field of wireless communications technologies, and in particular, to a method for configuring a reference signal, a user equipment (User Equipment, UE), and an evolved node B (evolved Node B, eNB).

BACKGROUND

In the existing long term evolution (Long Term Evolution, LTE) release 10 (Release 10, R10), an eNB may notify a UE of a used channel state information-reference signal (Channel State Information Reference Signal, CSI RS) configuration through radio resource control (Radio Resource Control, RRC) signaling, and the UE estimates a corresponding channel according to the CSI RS configuration and feeds back relevant channel state information (Channel State Information, CSI). In an R10 system, generally, each cell identifier corresponds to one CSI RS configuration, and in this case, a CSI RS may be configured for a UE according to a cell identifier.

In a heterogeneous network deployment scenario newly introduced in LTE R11, a same cell identifier corresponds to multiple transmission points (Transmission Point, TP). For example, a low-power remote radio head (Remote Radio Head, RRH) is located in coverage of a macro base station, and TPs formed by different RRHs and the macro base station share a same cell identifier. However, the macro base station and each of the RRHs generally have different CSI RS configurations. That is, in this case, a same cell identifier corresponds to multiple CSI RS configurations. Because the macro base station and each of the RRHs correspond to different channel conditions and interference conditions, an eNB needs to configure a proper CSI RS related to a same cell identifier for a UE instead of configuring only according to the cell identifier, so that the UE can select a proper TP for access.

In addition, for the heterogeneous network deployment scenario, a cell specific reference signal CRS (Cell specific Reference Signal, CRS) faces a similar CRS port selection problem caused by that an RRH or a macro base station is geographically separately configured.

SUMMARY

Embodiments of the present invention provide a method for configuring a reference signal, a UE, and an eNB, so as to solve a reference signal configuration problem caused by that an RRH or a base station is geographically separately configured in actual network deployment.

In one aspect, an embodiment of the present invention provides a method for configuring a reference signal, including:

determining, by a UE, a reference signal configuration priority set, and sending information of the reference signal configuration priority set to an eNB; and receiving, by the UE, a reference signal configuration measurement set sent by the eNB, where the reference signal configuration measurement set is configured by the eNB according to the information of the reference signal configuration priority set, and the reference signal configuration measurement set is used for the UE to measure and feed back channel state information.

In another aspect, an embodiment of the present invention provides a method for configuring a reference signal, including:

receiving, by an eNB, information of a reference signal configuration priority set, where the information of the reference signal configuration priority set is sent by a UE; and configuring, by the eNB, a reference signal configuration measurement set according to the information of the reference signal configuration priority set, and sending the reference signal configuration measurement set to the UE, where the reference signal configuration measurement set is used for the UE to measure and feed back channel state information.

In one aspect, an embodiment of the present invention provides a UE, including:

a sending unit, configured to determine a reference signal configuration priority set, and send information of the reference signal configuration priority set to an evolved node B eNB; and a first receiving unit, configured to receive a reference signal configuration measurement set sent by the eNB, where the reference signal configuration measurement set is configured by the eNB according to the information of the reference signal configuration priority set, and the reference signal configuration measurement set is used for the UE to measure and feed back channel state information.

In another aspect, an embodiment of the present invention provides a network device, including:

a receiving unit, configured to receive information of a reference signal configuration priority set, where the information of the reference signal configuration priority set is sent by a UE; and a first sending unit, configured to perform configuration on a reference signal configuration measurement set according to the information of the reference signal configuration priority set, and send the reference signal configuration measurement set to the user equipment UE, where the reference signal configuration measurement set is used for the UE to measure and feed back channel state information.

It can be seen from the foregoing technical solutions that, in the embodiments of the present invention, an eNB acquires a reference signal configuration priority set reported by a UE, and determines, from the priority set, a reference signal configuration measurement set finally configured for the UE, so that the eNB can configure a reference signal for the UE according to the priority set reported by the UE, and when an RRH or a base station is geographically separated, can select a reference signal configuration matched with an optimal actual channel of the UE, and further the UE can acquire a good channel condition.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show some embodiments of the present invention, and persons of ordinary skill in the art may still derive other drawings from these accompanying drawings without creative efforts.

DESCRIPTION OF EMBODIMENTS

To make the objectives, technical solutions, and advantages of the embodiments of the present invention more comprehensible, the following clearly describes the technical solutions in the embodiments of the present invention with reference to the accompanying drawings in the embodiments of the present invention. Apparently, the embodiments to be described are merely a part rather than all of the embodiments of the present invention. All other embodiments obtained by persons of ordinary skill in the art based on the embodiments of the present invention without creative efforts shall fall within the protection scope of the present invention.

Figure 1:
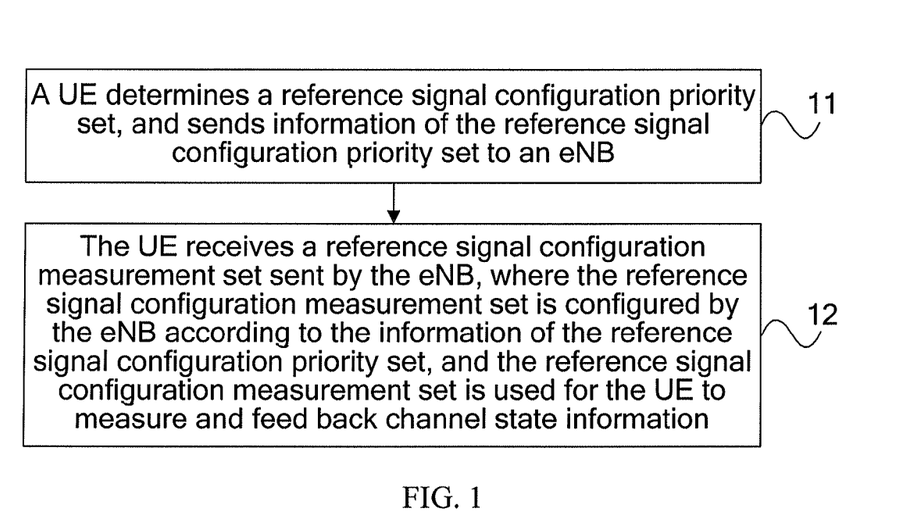
FIG. 1 is a schematic flowchart of a method for configuring a reference signal according to an embodiment of the present invention.

FIG. 1 is a schematic flowchart of a method for configuring a reference signal according to an embodiment of the present invention, which includes:

Step 11: A UE determines a reference signal configuration priority set, and sends information of the reference signal configuration priority set to an eNB.

The reference signal configuration priority set (hereinafter referred to as priority set) is a set of reference signal configurations determined by the UE. The UE may determine, by measuring metric information corresponding to each reference signal configuration, a reference signal configuration included in the priority set.

The information of the priority set may include at least one of the following items: each reference signal configuration included in the priority set, metric information corresponding to a reference signal configuration included in the priority set, and difference metric information between metric information corresponding to the reference signal configurations included in the priority set.

Further, before the UE determines the priority set, the method may further include: The UE acquires a reference signal configuration candidate set (hereinafter referred to as candidate set), where the candidate set is a set of reference signal configurations acquired by the UE; and then, the UE may determine the reference signal configuration priority set according to the reference signal configuration candidate set. For example, metric information corresponding to each reference signal configuration in the reference signal configuration candidate set is measured, and the number of reference signal configurations included in the reference signal configuration priority set is determined; and reference signal configurations of the number are sequentially selected from the reference signal configuration candidate set according to the metric information, so as to form the reference signal configuration priority set.

The foregoing metric information may be at least one of the following items: a reference signal received power (Reference Signal Received Power, RSRP), reference signal received quality (Reference Signal Received Quality, RSRQ), a received signal strength indicator (Received Signal Strength Indicator, RSSI), path loss (Path Loss, PL), and the like.

By taking an RSRP as an example, after the UE obtains an RSRP corresponding to each reference signal configuration through measurement, the UE may select, according a descending arrangement sequence of RSRPs, a certain number of reference signal configurations from the candidate set, so as to form the priority set.

Further, the reference signal configuration candidate set may include: reference signal configurations having a same cell identifier, where resources occupied by the reference signal configurations having the same cell identifier do not overlap each other.

The foregoing reference signal configuration may include: a CSI RS configuration or a cell specific reference signal (Cell-specific RS, CRS) port configuration, where the CRS port configuration refers to a configuration formed by a part or all of port subsets in a CRS configuration.

The CSI RS configuration may include information such as the number of CSI RS ports, a resource configuration, a sub-frame configuration, and a transmit power of a reference physical downlink shared channel (Physical Downlink Shared Channel, PDSCH). The resource configuration may include a time and/or frequency resource position occupied by each port, a used sequence or orthogonal cover code (Orthogonal Cover Code, OCC), or the like. After acquiring the CSI RS configuration, the UE may measure CSI according to a CSI RS. The CSI includes a rank indicator (Rank Indicator, RI), a precoding matrix indicator (Precoding Matrix Indicator, PMI), a channel quality indicator (Channel Quality Indicator, CQI), and the like.

The CRS port configuration includes information such as a resource configuration, the number of CRS ports, a port number, and a sub-frame configuration, where the resource configuration may include a time and/or frequency resource position occupied by each port, a used sequence, and the like. Channel state information may be measured and fed back according to the CRS port configuration, or the CRS port configuration may be used to determine a transmit diversity solution adopted by a physical downlink control channel (Physical Downlink Control Channel, PDCCH).

Step 12: The UE receives a reference signal configuration measurement set sent by the eNB, where the reference signal configuration measurement set is configured by the eNB according to the information of the reference signal configuration priority set, and the reference signal configuration measurement set is used for the UE to measure and feed back channel state information.

The reference signal configuration measurement set (hereinafter referred to as measurement set) is a set of reference signal configurations that is configured by the eNB for the UE, so that the UE performs reference signal measurement according to the measurement set. The UE may measure and feed back the channel state information according to the reference signal configuration measurement set.

The measurement set may be the same as the priority set, or may be a subset of the priority set, a combination of reference signal configurations in the priority set, or a port subset of a reference signal configuration in the priority set.

Further, if the measurement set is a combination of reference signal configurations in the priority set, the measurement set occupies a resource of each reference signal configuration in the combination of the reference signal configurations in the priority set, which may be at least one type of the following resources: a time resource, a frequency resource, a sequence resource, and an OCC resource.

Further, if the measurement set is a port subset of a reference signal configuration in the priority set, the measurement set occupies a resource of the port subset of the reference signal configuration in the priority set, which may be at least one type of the following resources: a time resource, a frequency resource, a sequence resource, and an OCC resource.

In the embodiment, an eNB acquires a reference signal configuration priority set reported by a UE, and determines, from the priority set, a reference signal configuration measurement set finally configured for the UE, and the UE can select the reference signal configuration priority set for itself, so that the eNB can configure a reference signal for the UE according to the priority set, and can select a reference signal configuration matched with an optimal actual channel of the UE, and further the UE can acquire a good channel condition.

Figure 2:
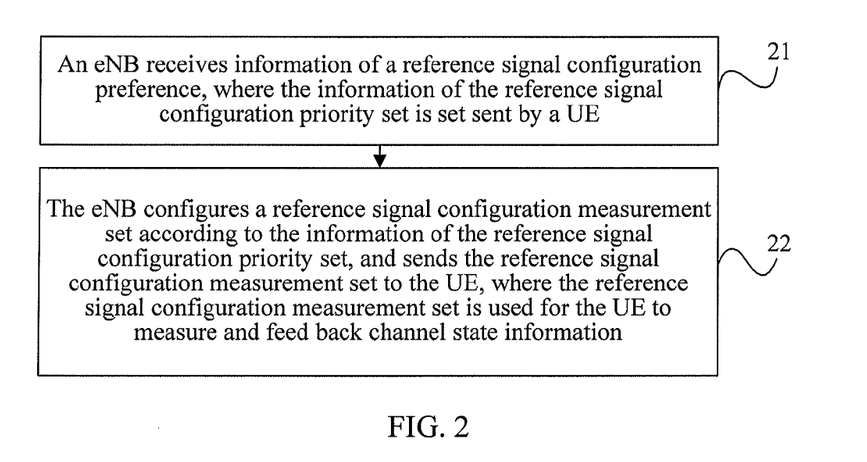
FIG. 2 is a schematic flowchart of a method for configuring a reference signal according to another embodiment of the present invention.

FIG. 2 is a schematic flowchart of a method for configuring a reference signal according to another embodiment of the present invention, where the method includes:

Step 21: An eNB receives information of a reference signal configuration preference, where the information of the reference signal configuration priority set is set sent by a UE.

Before this step, the method may further include: The eNB sends a reference signal configuration candidate set to the UE, so that the UE determines the reference signal configuration priority set according to the reference signal configuration candidate set.

Preferably, the numbers of ports of reference signal configurations included in the reference signal configuration candidate set are the same.

The foregoing information of the reference signal configuration priority set includes: a reference signal configuration included in the reference signal configuration priority set; a reference signal configuration included in the reference signal configuration priority set and metric information corresponding to the reference signal configuration; metric information corresponding to a specified reference signal configuration in the priority set, and a difference between metric information corresponding to another reference signal configuration in the priority set and the metric information corresponding to the specified reference signal configuration, where the metric information corresponds to the reference signal configuration; or a reference signal configuration included in the reference signal configuration priority set and a difference between metric information corresponding to reference signal configurations.

Step 22: The eNB determines a reference signal configuration measurement set according to the information of the reference signal configuration priority set, and sends the reference signal configuration measurement set to the UE, where the reference signal configuration measurement set is used for the UE to measure and feed back channel state information.

The reference signal configuration measurement set is the same as the reference signal configuration priority set; or the reference signal configuration measurement set is a subset of the reference signal configuration priority set; or the reference signal configuration measurement set includes a reference signal configuration obtained by combining reference signal configurations in the reference signal configuration priority set; or the reference signal configuration measurement set includes a port subset of a reference signal configuration in the reference signal configuration priority set.

Further, a resource occupied by the reference signal configuration that is obtained after combination is the same as a sum of resources occupied by at least two reference signal configurations before combination, where the resource includes at least one of the following items: a time resource, a frequency resource, a sequence resource, and an OCC resource; or, a resource occupied by the port subset is a part or all of a resource occupied by one reference signal configuration, where the resource includes at least one of the following items: a time resource, a frequency resource, a sequence resource, and an OCC resource.

The foregoing metric information includes: an RSRP, RSRQ, an RSSI, or a PL.

In the embodiment, an eNB acquires a reference signal configuration priority set reported by a UE, and determines, from the priority set, a reference signal configuration measurement set finally configured for the UE, and the UE can select the reference signal configuration priority set for itself, so that the eNB can configure a reference signal for the UE according to the priority set, and can select a reference signal configuration matched with an optimal actual channel of the UE, and further the UE can acquire a good channel condition.

Figure 3:
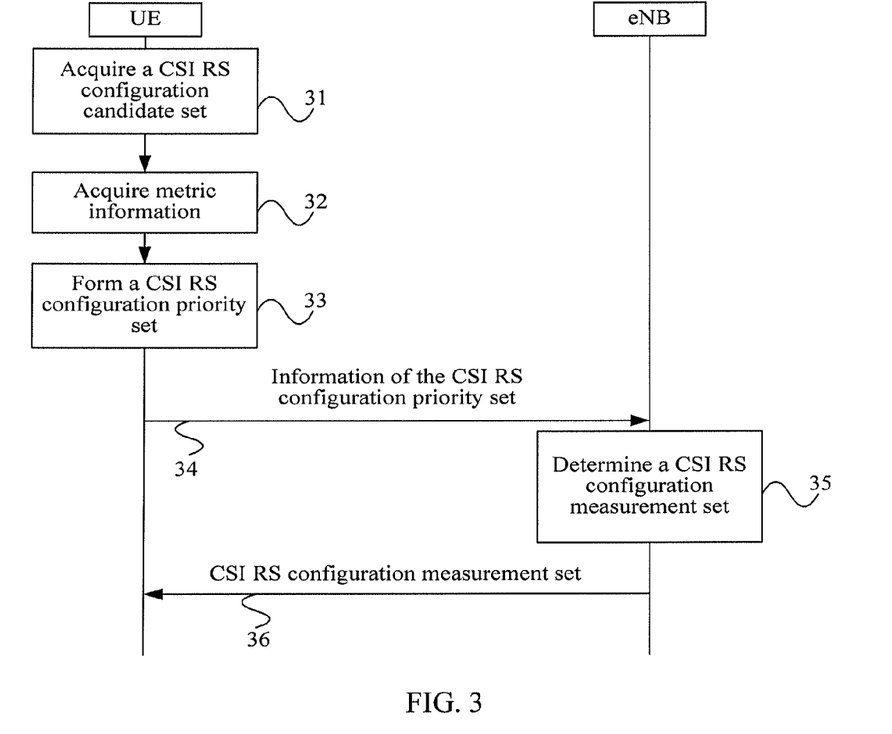
FIG. 3 is a schematic flowchart of a method for configuring a reference signal according to another embodiment of the present invention.
Figure 4:
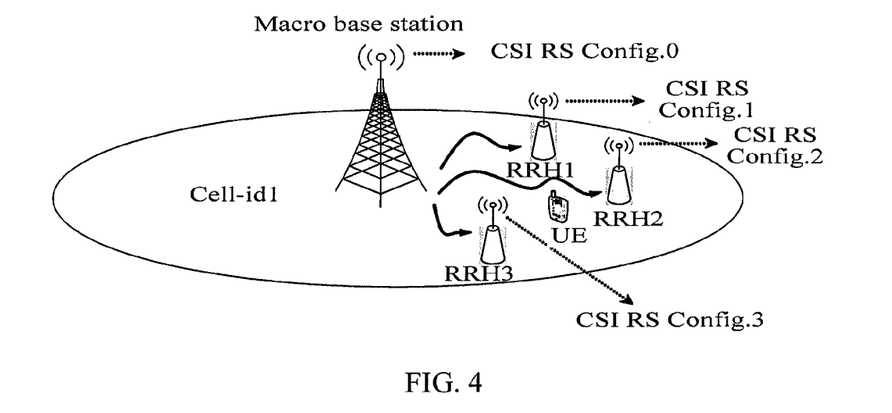
FIG. 4 is a schematic structural diagram of a system corresponding to FIG. 3.

FIG. 3 is a schematic flowchart of a method for configuring a reference signal according to another embodiment of the present invention, and FIG. 4 is a schematic structural diagram of a system corresponding to FIG. 3.

Referring to FIG. 4, in this embodiment, the system includes a macro base station and three RRHs, which share a same cell ID, such as a cell-id 1. Each RRH is connected to an eNB through an optical fiber. CSI RS configurations of the macro base station and the three RRHs are CSI RS Config.0, CSI RS Config.1, CSI RS Config.2, and CSI RS Config.3, respectively. It should be noted that, in this embodiment, the system includes a macro base station, but the embodiment of the present invention may also be applied in a scenario without a macro base station, for example, the system includes only RRHs, and each RRH is connected to the eNB through an optical fiber or another medium. The eNB may be located at the macro base station or may be located at an RRH.

Referring to FIG. 3, this embodiment includes:

Step 31: A UE acquires a CSI RS configuration candidate set configured by an eNB, where the candidate set includes one or more CSI RS configurations.

The UE may acquire the candidate set in the following manners:

(1) The UE receives a broadcast message sent by the eNB, where the broadcast message carries a candidate set corresponding to a cell identifier, and the UE acquires a corresponding candidate set from the received broadcast message by using a cell identifier of the UE.

For example, a cell whose identifier is the cell-id 1 shown in FIG. 4 is configured with CSI RS Config.0, CSI RS Config.1, CSI RS Config.2, and CSI RS Config.3. The eNB may broadcast a set that includes the foregoing four CSI RS configurations to the UE. The UE obtains the candidate set according to the cell identifier cell-id 1.

(2) The UE receives a message that is specified by the UE and is sent by the eNB, where the message that is specified by the UE carries a candidate set.

For example, it is assumed that four TPs, including the macro base station and the RRHs shown in FIG. 4, are arranged as the macro base station, an RRH 2, an RRH 1, and an RRH 3 in descending order of received SRS powers. In this case, if it is determined that a candidate set includes two CSI RS configurations, the eNB notifies, through the message that is specified by the UE, the UE that a used candidate set includes: CSI RS Config.0 and CSI RS Config.2. If it is determined that a candidate set includes three CSI RS configurations, the eNB notifies the UE that a used candidate set includes: CSI RS Config.0, CSI RS Config.2, and CSI RS Config.1. If it is determined that a candidate set includes four CSI RS configurations, the eNB notifies the UE that a used candidate set includes the foregoing four CSI RS configurations.

Preferably, the candidate set may include CSI RS configurations having the same number of ports. The number of ports may be 1, 2, 4, or 8. For example, the set number of ports is 2, in the foregoing four CSI RS configurations, the number of ports of CSI RS Config.0 and CSI RS Config.1 are both 2, and accordingly, the foregoing candidate set includes: CSI RS Config.0 and CSI RS Config.1.

Step 32: The UE acquires metric information corresponding to each CSI RS configuration in the CSI RS configuration candidate set.

The metric information $\text{Metric}_{CSI\_RS}$ may include at least one of the following items: $\text{RSRP}_{CSI\_RS}$, $\text{RSRQ}_{CSI\_RS}$, $\text{RSSI}_{CSI\_RS}$, and $\text{PL}_{CSI\_RS}$.

A manner for acquiring metric information may be as follows:

(1) $\text{RSRP}_{CSI\_RS}$ is defined as an RSRP obtained based on a CSI RS configuration, where the $\text{RSRP}_{CSI\_RS}$ may be obtained based on measurement of a certain port in the CSI RS configuration, or may be obtained based on measurement of multiple ports in the CSI RS configuration.

(2) $\text{RSRQ}_{CSI\_RS}$ is defined as RSRQ obtained based on a CSI RS configuration, where the $\text{RSRQ}_{CSI\_RS}$ may be obtained based on measurement of a certain port in the CSI RS configuration, or may be obtained based on measurement of multiple ports in the CSI RS configuration.

(3) $\text{RSSI}_{CSI\_RS}$ is defined as an RSSI obtained based on a CSI RS configuration, where the $\text{RSSI}_{CSI\_RS}$ may be obtained based on measurement of a certain port in the CSI RS configuration, or may be obtained based on measurement of multiple ports in the CSI RS configuration.

(4) $\text{PL}_{CSI\_RS}$ is defined as PL obtained based on a CSI RS configuration, where the $\text{PL}_{CSI\_RS}$ may be obtained based on measurement of a certain port in the CSI RS configuration, or may be obtained based on measurement of multiple ports in the CSI RS configuration.

Step 33: The UE sequentially selects M2 CSI RS configurations from the CSI RS configuration candidate set according to the metric information, so as to form a CSI RS configuration priority set.

M2 may be notified by the eNB to the UE, or may be determined by the UE according to M1, where M1 is the number of CSI RS configurations included in the candidate set. For example, implicit correspondence between M1 and M2 may include, but is not limited to, content shown in Table 1.

TABLE 1

| M1 | M2 |
|---|---|
| M1 > 10 | 5 |
| 6 < M1 <= 10 | 3 |
| 2 < M1 <= 6 | 2 |
| 1 <= M1 <= 2 | 1 |

Specifically, it is assumed that M1=3, the candidate set includes CSI RS Config.0, CSI RS Config.1, and CSI RS Config.2, and the foregoing configurations are arranged as CSI RS Config.0, CSI RS Config.2, and CSI RS Config.1 in descending order according to metric information obtained by the UE through measurement. Then, according to the foregoing implicit correspondence, M2=2, and accordingly, the first two in the candidate set after arrangement are selected to form the priority set, that is, the priority set includes: CSI RS Config.0 and CSI RS Config.2.

Step 34: The UE sends information of the CSI RS configuration priority set to the eNB.

The information of the priority set may be a CSI RS configuration included in the priority set; a CSI RS configuration and corresponding metric information; a CSI RS configuration, metric information corresponding to a specified reference signal configuration, and a difference between metric information corresponding to another reference signal configuration and the metric information corresponding to the specified reference signal configuration, where the metric information corresponds to the CSI RS configuration; or a CSI RS configuration, and a difference of metric information corresponding to CSI RS configurations.

Further, for a CSI RS configuration included in the priority set, r may be indexed by using the following combination:

$$r = \sum_{i=0}^{M-1} \left\langle \begin{matrix} M_1 - s_i \\ M_2 - i \end{matrix} \right\rangle.$$

$\{s_i\}_{i=0}^{M_2-1}$, ($1 \leq s_i \leq M_1$, $s_i < s_{i+1}$) includes indexes of $M_2$ CSI RS configurations included in the priority set, and $$\left\langle \begin{matrix} M_1 - s_i \\ M_2 - i \end{matrix} \right\rangle$$

is an extended binomial coefficient and defined as $$\left\langle \begin{matrix} x \\ y \end{matrix} \right\rangle = \begin{cases} \begin{pmatrix} x \\ y \end{pmatrix} & x \geq y \\ 0 & x < y \end{cases},$$

where $$\begin{pmatrix} x \\ y \end{pmatrix}$$

is a combinatorial number of selecting item y from item x.

Specifically: (1) The UE reports each CSI RS configuration in the priority set. For example, all reported CSI RS configurations in the priority set include CSI RS Config.0 and CSI RS Config.2.

Further, each CSI RS configuration in the priority set reported by the UE is sequential, and in the embodiment of the present invention, the sequence includes: a priority sequence or a sequence of values of corresponding metric information. That the sequence of values of metric information is used and the metric information is an RSRP is taken as an example, if a value of an RSRP corresponding to CSI RS Config.0 is smaller than a value of an RSRP corresponding to CSI RS Config.2, CSI RS configurations in the priority set reported by the UE are sequentially CSI RS Config.0 and CSI RS Config.2.

(2) The UE reports each CSI RS configuration in the priority set and corresponding metric information. For example, the UE reports CSI RS Config.0 and CSI RS Config.2 and corresponding metric information $Metric_{CSI\ RS\ Config.0}$ and $Metric_{CSI\ RS\ Config.2}$.

Further, each CSI RS configuration in the priority set reported by the UE is sequential. For example, CSI RS configurations in the priority set reported by the UE are sequentially CSI RS Config.0 and CSI RS Config.2, and the corresponding metric information $Metric_{CSI\ RS\ Config.0}$ and $Metric_{CSI\ RS\ Config.2}$.

(3) The UE reports each CSI RS configuration in the priority set, metric information of a part of CSI RS configurations, and a difference between metric information of another part of CSI RS configurations and the metric information of the part of the CSI RS configurations. For example, the UE reports CSI RS Config.0 and CSI RS Config.2, metric information $Metric_{CSI\ RS\ Config.0}$, and a difference metric $Metric_{CSI\ RS\ Config.2} - Metric_{CSI\ RS\ Config.0}$ or $Metric_{CSI\ RS\ Config.0} - Metric_{CSI\ RS\ Config.2}$.

Further, each CSI RS configuration in the priority set reported by the UE is sequential. For example, the CSI RS configurations in the priority set reported by the UE are sequentially CSI RS Config.0 and CSI RS Config.2, the corresponding metric information $Metric_{CSI\ RS\ Config.0}$, and the difference metric $Metric_{CSI\ RS\ Config.2} - Metric_{CSI\ RS\ Config.0}$ or $Metric_{CSI\ RS\ Config.0} - Metric_{CSI\ RS\ Config.2}$.

(4) The UE reports each CSI RS configuration in the priority set and a difference between metric information corresponding to CSI RS configurations. For example, the UE reports CSI RS Config.0 and CSI RS Config.2, and a corresponding difference metric $Metric_{CSI\ RS\ Config.2} - Metric_{CSI\ RS\ Config.0}$ or $Metric_{CSI\ RS\ Config.0} - Metric_{CSI\ RS\ Config.2}$.

Further, each CSI RS configuration in the priority set reported by the UE is sequential. For example, the CSI RS configurations in the priority set reported by the UE are sequentially CSI RS Config.0 and CSI RS Config.2, and the corresponding difference metric $Metric_{CSI\ RS\ Config.2} - Metric_{CSI\ RS\ Config.0}$ or $Metric_{CSI\ RS\ Config.0} - Metric_{CSI\ RS\ Config.2}$.

Step 35: The eNB determines a CSI RS configuration measurement set according to the information of the CSI RS configuration priority set.

The measurement set may include: the priority set, a subset of the priority set, a configuration combination of CSI RS configurations in the priority set, or a port subset of a CSI RS configuration in the priority set.

Specifically: (1) The measurement set is the same as the priority set.

For example, the information of the priority set reported by the UE includes: CSI RS Config.0 and CSI RS Config.2, and accordingly, the measurement set includes: CSI RS Config.0 and CSI RS Config.2.

(2) The measurement set is a subset of the priority set.

For example, the information of the priority set reported by the UE includes: CSI RS Config.0 and CSI RS Config.2, and accordingly, the measurement set may include: CSI RS Config.0; or the information of the priority set reported by the UE includes: CSI RS Config.0, CSI RS Config.2, $Metric_{CSI\ RS\ Config.0}$, and $Metric_{CSI\ RS\ Config.2}$, and if $Metric_{CSI\ RS\ Config.2} - Metric_{CSI\ RS\ Config.0} >= Threshold_{Metric}$, the measurement set may include: CSI RS Config.0 and CSI RS Config.2; otherwise, the measurement set may include: CSI RS Config.0; or the information of the priority set reported by the UE includes: CSI RS Config.0, CSI RS Config.2, and $Metric_{CSI\ RS\ Config.2} - Metric_{CSI\ RS\ Config.0}$, and if $Metric_{CSI\ RS\ Config.2} - Metric_{CSI\ RS\ Config.0} >= Threshold_{Metric}$, the measurement set may include: CSI RS Config.0 and CSI RS Config.2; otherwise, the measurement set may include: CSI RS Config.0.

$Threshold_{Metric}$ in the foregoing is a pre-defined threshold, for example, $Threshold_{Metric} = 0$, $-5$, or the like.

(3) The measurement set includes a configuration combination of CSI RS configurations in the priority set.

For example, it is assumed that the information of the priority set reported by the UE includes: CSI RS Config.0 and CSI RS Config.2, and CSI RS Config.0 and CSI RS Config.2 are both a CSI RS configuration having two ports. Time/frequency resources occupied by CSI RS Config.0 and CSI RS Config.2 correspond to a certain CSI RS configuration having four ports, where it is assumed that the CSI RS configuration having four ports is CSI RS Config.0', and the measurement set may include CSI RS Config.0'.

(4) The measurement set includes a port subset of a CSI RS configuration in the priority set. For example, it is assumed that the information of the priority set reported by the UE includes: CSI RS Config.0, and CSI RS Config.0 is a CSI RS configuration having four ports. A time/frequency resource occupied by CSI RS Config.0 correspond to certain two CSI RS configurations having two ports, where it is assumed that one of the CSI RS configurations having two ports is CSI RS Config.0", and the measurement set may include CSI RS Config.0".

Step 36: The eNB notifies the UE of the CSI RS configuration measurement set. Then, the UE may perform CSI measurement according to each CSI RS configuration in the CSI RS configuration measurement set.

In this embodiment, a UE reports a priority set, so that an eNB can configure a proper reference signal for the UE, and the UE can acquire a good channel condition. In addition, in this embodiment, the UE selects the priority set from a candidate set, so that a size of the candidate set can be restricted, thereby effectively reducing implementation complexity of measurement of the UE. Moreover, in this embodiment, the UE feeds back the priority set, and a size of the priority set can be restricted, thereby effectively reducing a feedback overhead of the UE. This embodiment is applicable to a scenario of a CSI RS configuration.

Figure 5:
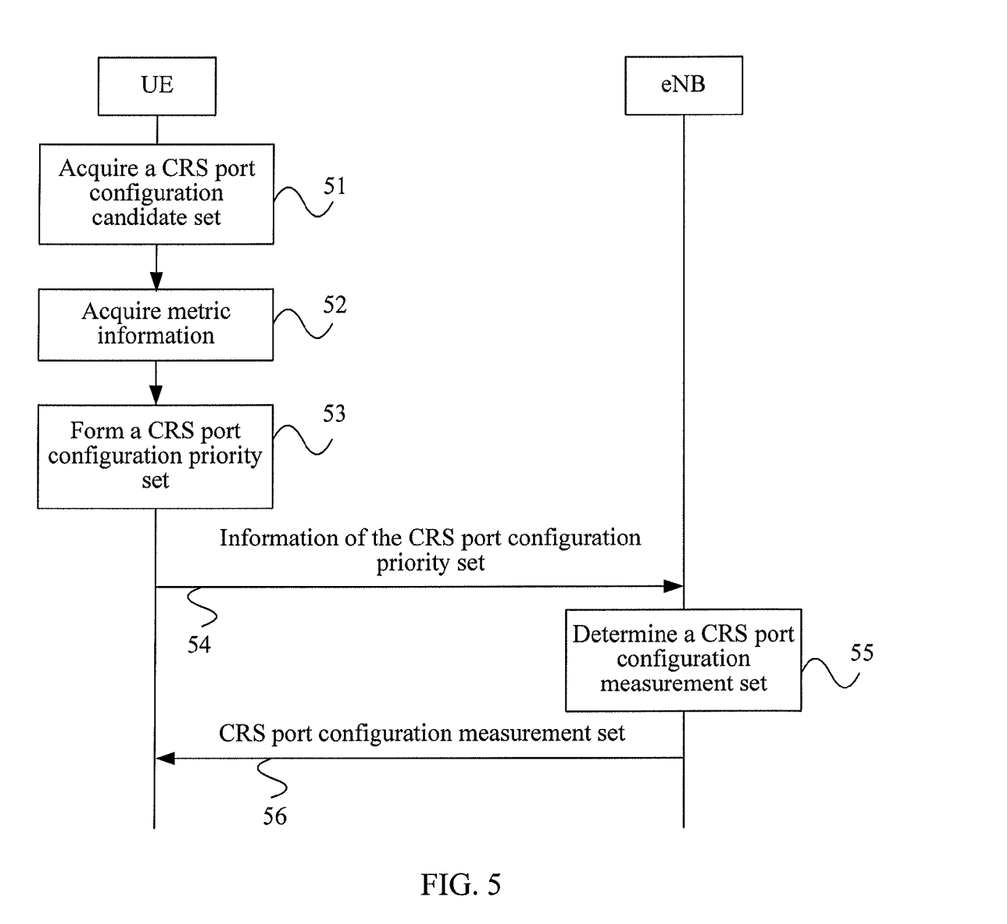
FIG. 5 is a schematic flowchart of a method for configuring a reference signal according to another embodiment of the present invention.
Figure 6:
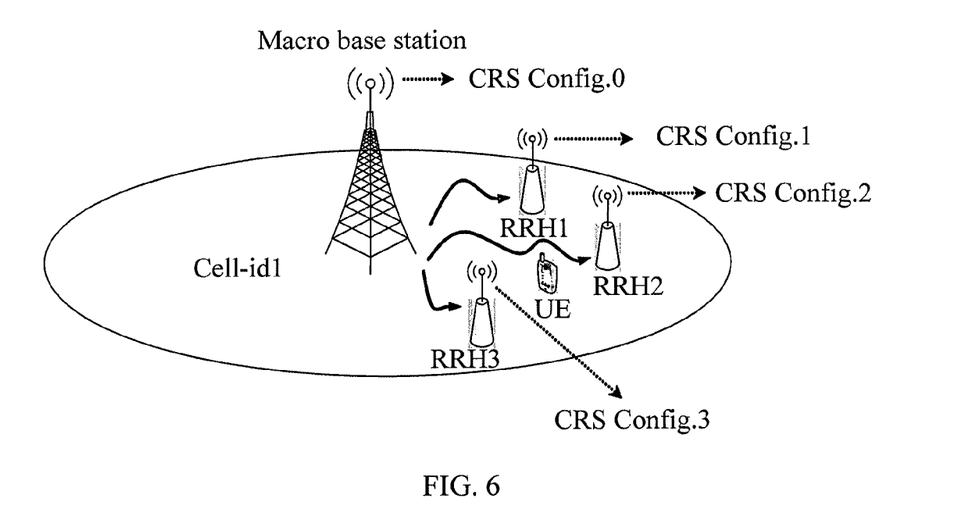
FIG. 6 is a schematic structural diagram of a system corresponding to FIG. 5.

FIG. 5 is a schematic flowchart of a method for configuring a reference signal according to another embodiment of the present invention, and FIG. 6 is a schematic structural diagram of a system corresponding to FIG. 5.

Referring to FIG. 6, in this embodiment, the system includes a macro base station and three RRHs, which share a same cell ID, such as a cell-id 1. Each RRH is connected to an eNB through an optical fiber. CRS port configurations of the macro base station and the three RRHs are CRS Config.0, CRS Config.1, CRS Config.2, and CRS Config.3, respectively. It should be noted that, in this embodiment, the system includes a macro base station, but the embodiment of the present invention may also be applied in a scenario without a macro base station, for example, the system includes only RRHs, and each RRH is connected to the eNB through an optical fiber or another medium. The eNB may be located at the macro base station or may be located at an RRH.

Referring to FIG. 5, this embodiment includes:

Step 51: A UE acquires a CRS port configuration candidate set configured by an eNB, where the candidate set includes one or more CRS port configurations.

The UE may acquire the candidate set in the following manners: (1) The UE receives a PBCH (Physical Broadcast Channel, physical broadcast channel), and the UE acquires a corresponding CRS configuration from the received PBCH by adopting a cell identifier of the UE, where the CRS configuration is the CRS port configuration candidate set.

For example, a cell whose identifier is the cell-id 1 shown in FIG. 6 is configured with CRS Config.0, CRS Config.1, CRS Config.2, and CRS Config.3, where each configuration includes one CRS port, and the foregoing port may occupy a same time/frequency resource position or may occupy different time/frequency resource positions. For example: different resource positions are occupied, and accordingly, four CRS ports are included, and CRS configurations corresponding to the four CRS ports may be carried by the eNB through the PBCH and received by the UE. For example: two different resource positions are occupied in total, and accordingly, two CRS ports are included, and CRS configurations corresponding to the two CRS ports may be carried by the eNB through the PBCH and received by the UE.

(2) The UE receives a broadcast message sent by the eNB, where the broadcast message carries a candidate set corresponding to a cell identifier, and the UE acquires a corresponding candidate set from the received broadcast message by using a cell identifier of the UE.

(3) The UE receives a message that is specified by the UE and is sent by the eNB, where the message that is specified by the UE carries a candidate set.

For example, it is assumed that four TPs, including the macro base station and the RRHs shown in FIG. 6, are arranged as the macro base station, an RRH 2, an RRH 1, and an RRH 3 in descending order of received SRS powers. In this case, if it is determined that a candidate set includes two CRS port configurations, the eNB notifies, through the message that is specified by the UE, the UE that a used candidate set includes: CRS Config.0 and CRS Config.2. If it is determined that a candidate set includes three CRS port configurations, the eNB notifies the UE that a used candidate set includes: CRS Config.0, CRS Config.2, and CRS Config.1. If it is determined that a candidate set includes four CRS port configurations, the eNB notifies the UE that a used candidate set includes the foregoing four CRS port configurations.

Preferably, the candidate set may include CRS port configurations having the same number of ports. The number of ports may be 1, 2, 4, or 8. For example, the set number of ports is 2, in the foregoing four CRS port configurations, the number of ports of CRS Config.0 and CRS Config.1 are both 2, and accordingly, the foregoing candidate set includes: CRS Config.0 and CRS Config.1.

Step 52: The UE acquires metric information corresponding to each CRS port configuration in the CRS port configuration candidate set.

The metric information $Metric_{CRS}$ may include at least one of the following items: $RSRP_{CRS}$, $RSRQ_{CRS}$, $RSSI_{CRS}$, and $PL_{CRS}$.

A manner for acquiring metric information may be as follows:

(1) $RSRP_{CRS}$ is defined as an RSRP obtained based on a CRS port configuration, where the $RSRP_{CRS}$ may be obtained based on measurement of a certain port in the CSI port configuration, or may be obtained based on measurement of multiple ports in the CRS port configuration.

(2) $RSRQ_{CRS}$ is defined as RSRQ obtained based on a CRS port configuration, where the $RSRQ_{CRS}$ may be obtained based on measurement of a certain port in the CSI port configuration, or may be obtained based on measurement of multiple ports in the CRS port configuration.

(3) $RSSI_{CRS}$ is defined as an RSSI obtained based on a CRS port configuration, where the $RSSI_{CRS}$ may be obtained based on measurement of a certain port in the CSI port configuration, or may be obtained based on measurement of multiple ports in the CRS port configuration.

(4) $PL_{CRS}$ is defined as PL obtained based on a CRS port configuration, where the $PL_{CRS}$ may be obtained based on measurement of a certain port in the CSI port configuration, or may be obtained based on measurement of multiple ports in the CRS port configuration.

Step 53: The UE sequentially selects M2 CRS port configurations from the CRS port configuration candidate set according to the metric information, so as to form a CRS port configuration priority set.

M2 may be notified by the eNB to the UE, or may be determined by the UE according to M1, where M1 is the number of CRS port configurations included in the candidate set. For example, implicit correspondence between M1 and M2 may include, but is not limited to, content shown in Table 1.

TABLE 1

| M1 | M2 |
|---|---|
| M1 > 10 | 5 |
| 6 < M1 <= 10 | 3 |
| 2 < M1 <= 6 | 2 |
| 1 <= M1 <= 2 | 1 |

Specifically, it is assumed that M1=3, the candidate set includes CRS Config.0, CRS Config.1, and CRS Config.2, and the foregoing configurations are arranged as CRS Config.0, CRS Config.2, and CRS Config.1 in descending order according to metric information obtained by the UE through measurement. Then, according to the foregoing implicit correspondence, M2=2, and accordingly, the first two in the candidate set after arrangement are selected to form the priority set, that is, the priority set includes: CRS Config.0 and CRS Config.2.

Step 54: The UE sends information of the CRS port configuration priority set to the eNB.

The information of the priority set may be a CRS port configuration included in the priority set; a CRS port configuration and corresponding metric information; a CRS port configuration, metric information corresponding to a specified CRS port configuration, and difference metric information between metric information corresponding to another CRS port configuration and the metric information corresponding to the specified CRS port configuration, where the metric information corresponds to the CRS port configuration; or a CRS port configuration, and difference metric information between metric information corresponding to CRS port configurations.

Further, for a CRS configuration included in the priority set, r may be indexed by using the following combination:

$$r = \sum_{i=0}^{M-1} \binom{M_1 - s_i}{M_2 - i}.$$

$\{s_i\}_{i=0}^{M_2-1}$, ($1 \leq s_i \leq M_1$, $s_i < s_{i+1}$) includes indexes of $M_2$ CRS configurations included in the priority set, and $$\binom{M_1 - s_i}{M_2 - i}$$

is an extended binomial coefficient and defined as $$\binom{x}{y} = \begin{cases} \binom{x}{y} & x \geq y \\ 0 & x < y \end{cases},$$

where $$\binom{x}{y}$$

is a combinatorial number of selecting item y from item x.

Specifically: (1) The UE reports each CRS port configuration in the priority set. For example, all reported CRS port configurations in the priority set include CRS Config.0 and CRS Config.2.

Further, each CRS port configuration in the priority set reported by the UE is sequential, and in the embodiment of the present invention, the sequence includes: a priority sequence or a sequence of values of corresponding metric information. That the sequence of values of metric information is used and the metric information is an RSRP is taken as an example, if a value of an RSRP corresponding to CRS Config.0 is smaller than a value of an RSRP corresponding to CRS Config.2, CRS port configurations in the priority set reported by the UE are sequentially CRS Config.0 and CRS Config.2.

(2) The UE reports each CRS port configuration in the priority set and corresponding metric information. For example, the UE reports CRS Config.0 and CRS Config.2 and corresponding metric information $Metric_{CRS\ Config.0}$ and $Metric_{CRS\ Config.2}$.

Further, each CRS port configuration in the priority set reported by the UE is sequential. For example, CRS port configurations in the priority set reported by the UE are sequentially CRS Config.0 and CRS Config.2, and the corresponding metric information $Metric_{CSI\ RS\ Config.0}$ and $Metric_{CSI\ RS\ Config.2}$.

(3) The UE reports each CRS port configuration in the priority set, metric information of a specified CRS port configuration, and a difference between metric information of another CRS port configuration and the metric information of the specified CRS port configuration. For example, the UE reports CRS Config.0 and CRS Config.2, metric information $Metric_{CRS\ Config.0}$, and a difference metric $Metric_{CRS\ Config.2} - Metric_{CRS\ Config.0}$ or $Metric_{CRS\ Config.0} - Metric_{CRS\ Config.2}$.

Further, each CRS port configuration in the priority set reported by the UE is sequential. For example, CRS port configurations in the priority set reported by the UE are sequentially CRS Config.0 and CRS Config.2, the corresponding metric information $Metric_{CRS\ Config.0}$, and the difference metric $Metric_{CRS\ Config.2} - Metric_{CRS\ Config.0}$ or $Metric_{CRS\ Config.0} - Metric_{CRS\ Config.2}$.

(4) The UE reports each CRS port configuration in the priority set and a difference between metric information corresponding to CRS port configurations. For example, the UE reports CRS Config.0 and CRS Config.2, and a corresponding difference metric $Metric_{CRS\ Config.2} - Metric_{CRS\ Config.0}$ or $Metric_{CRS\ Config.0} - Metric_{CRS\ Config.2}$.

Further, each CRS port configuration in the priority set reported by the UE is sequential. For example, the CRS port configurations in the priority set reported by the UE are sequentially CRS Config.0 and CRS Config.2, and the corresponding difference metric $Metric_{CRS\ Config.2} - Metric_{CRS\ Config.0}$ or $Metric_{CRS\ Config.0} - Metric_{CRS\ Config.2}$.

Step 55: The eNB determines a CRS port configuration measurement set according to the information of the CRS port configuration priority set, and notifies the UE of the CRS port configuration measurement set.

The measurement set may include: the priority set, a subset of the priority set, or a port subset of a CRS port configuration in the priority set.

Specifically: (1) The measurement set is the same as the priority set.

For example, the information of the priority set reported by the UE includes: CRS Config.0 and CRS Config.2, and accordingly, the measurement set includes: CRS Config.0 and CRS Config.2.

(2) The measurement set is a subset of the priority set.

For example, the information of the priority set reported by the UE includes: CRS Config.0 and CRS Config.2, and accordingly, the measurement set may include: CRS Config.0; or the information of the priority set reported by the UE includes: CRS Config.0, CRS Config.2, $Metric_{CRS\ Config.0}$, and $Metric_{CRS\ Config.2}$, and if $Metric_{CRS\ Config.2} - Metric_{CRS\ Config.0} \geq Threshold_{Metric}$, the measurement set may include: CRS Config.0 and CRS Config.2; otherwise, the measurement set may include: CRS Config.0; or the information of the priority set reported by the UE includes: CRS Config.0, CRS Config.2, and $Metric_{CRS\ Config.2} - Metric_{CRS\ Config.0}$, and if $Metric_{CRS\ Config.2} - Metric_{CRS\ Config.0} \geq Threshold_{Metric}$, the measurement set may include: CRS Config.0 and CRS Config.2; otherwise, the measurement set may include: CRS Config.0.

$Threshold_{Metric}$ in the foregoing is a pre-defined threshold, for example, $Threshold_{Metric} = 0$ or $-5$.

(3) The measurement set includes a port subset of a CRS port configuration in the priority set. For example, it is assumed that the information of the priority set reported by the UE includes: CRS Config.0, and CRS Config.0 is a CRS port configuration having four ports. A time/frequency resource occupied by CRS Config.0 correspond to a certain CRS port configuration having two ports, where it is assumed that the CRS port configuration having two ports is CRS Config.0", and the measurement set may include CRS Config.0".

Step 56: The eNB notifies the UE of the CRS port configuration measurement set.

In this embodiment, a UE reports a priority set, so that an eNB can configure a proper reference signal for the UE, and the UE can acquire a good channel condition. In addition, in this embodiment, the UE selects the priority set from a candidate set, so that a size of the candidate set can be restricted, thereby effectively reducing implementation complexity of measurement of the UE. Moreover, in this embodiment, the UE feeds back the priority set, and a size of the priority set can be restricted, thereby effectively reducing a feedback overhead of the UE. This embodiment is applicable to a scenario of a CRS port configuration.

Figure 7:
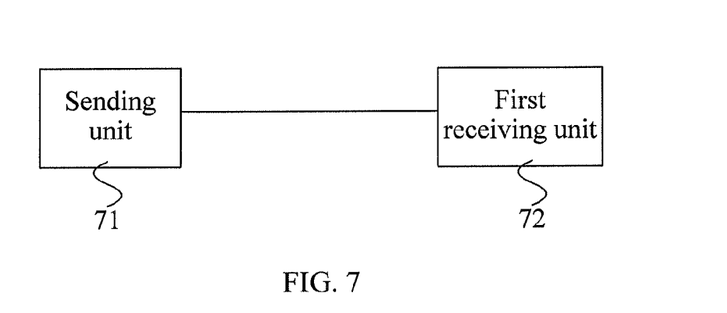
FIG. 7 is a schematic structural diagram of a UE according to an embodiment of the present invention.

FIG. 7 is a schematic structural diagram of a UE according to an embodiment of the present invention, which includes: a sending unit 71 and a first receiving unit 72. The sending unit 71 is configured to determine a reference signal configuration priority set, and send information of the reference signal configuration priority set to an eNB. The first receiving unit 72 is configured to receive a reference signal configuration measurement set sent by the eNB, where the reference signal configuration measurement set is configured by the eNB according to the information of the reference signal configuration priority set, and the reference signal configuration measurement set is used for the UE to measure and feed back channel state information.

Further, the UE may further include: a second receiving unit, configured to acquire a reference signal configuration candidate set, so as to determine the reference signal configuration priority set according to the reference signal configuration candidate set.

Further, the numbers of ports of reference signal configurations included in the reference signal configuration candidate set that is acquired by the second receiving unit are the same.

Further, the reference signal configuration candidate set acquired by the second receiving unit includes: reference signal configurations having a same cell identifier, where resources occupied by the reference signal configurations having the same cell identifier do not overlap each other.

The sending unit may be specifically configured to send a reference signal configuration included in the reference signal configuration priority set to the eNB; or send, to the eNB, a reference signal configuration included in the reference signal configuration priority set and metric information corresponding to the reference signal configuration; or send, to the eNB, a reference signal configuration included in the reference signal configuration priority set, metric information corresponding to a specified reference signal configuration, and difference metric information between metric information corresponding to another reference signal configuration and the metric information corresponding to the specified reference signal configuration; or send, to the eNB, a reference signal configuration included in the reference signal configuration priority set and difference metric information between metric information corresponding to reference signal configurations.

Further, the reference signal configuration included in the information of the reference signal configuration priority set is sequential, where the information of the reference signal configuration priority set is sent by the sending unit.

Further, the reference signal configuration measurement set received by the first receiving unit is the same as the reference signal configuration priority set; or the reference signal configuration measurement set received by the first receiving unit is a subset of the reference signal configuration priority set; or the reference signal configuration measurement set received by the first receiving unit includes a reference signal configuration obtained by combining reference signal configurations in the reference signal configuration priority set; or the reference signal configuration measurement set received by the first receiving unit includes a port subset of a reference signal configuration in the reference signal configuration priority set.

Further, a resource occupied by the reference signal configuration that is obtained after combination and is included in the reference signal configuration measurement set received by the first receiving unit is the same as a sum of resources occupied by at least two reference signal configurations before combination, where the resource includes at least one of the following items: a time resource, a frequency resource, a sequence resource, and an OCC resource; or a resource occupied by the port subset included in the reference signal configuration measurement set received by the first receiving unit is the same as a resource occupied by one reference signal configuration, where the resource includes at least one of the following items: a time resource, a frequency resource, a sequence resource, and an OCC resource.

The foregoing sending unit may determine, in the following manner, the reference signal configuration priority set according to the reference signal configuration candidate set received by the first receiving unit: measuring metric information corresponding to each reference signal configuration in the reference signal configuration candidate set, and determining the number of reference signal configurations included in the reference signal configuration priority set; and sequentially selecting reference signal configurations of the number from the reference signal configuration candidate set according to the metric information, so as to form the reference signal configuration priority set.

The number of reference signal configurations included in the reference signal configuration priority set may be determined in the following manner: determining, according to the number of reference signal configurations included in the reference signal configuration candidate set and implicit correspondence between the number of the reference signal configurations included in the reference signal candidate set and the number of the reference signal configurations included in the reference signal configuration priority set, the number of the reference signal configurations included in the reference signal configuration priority set; or receiving a notification message sent by the eNB, where the notification message carries the number of the reference signal configurations included in the reference signal configuration priority set.

The foregoing second receiving unit may be specifically configured to receive a broadcast message sent by the eNB, where the broadcast message carries a reference signal candidate set corresponding to a cell identifier, and the UE acquires a corresponding reference signal candidate set according to a cell identifier of the UE; or receive a message that is specified by the UE and is sent by the eNB, where the message that is specified by the UE carries the reference signal candidate set.

The foregoing reference signal configuration may include: a CSI RS configuration or a CRS port configuration, where the CRS port configuration refers to a configuration formed by a part or all of port subsets in a CRS configuration.

The foregoing metric information may include at least one of the following items: an RSRP, RSRQ, an RSSI, and path loss.

The same number of the ports may be: 1, 2, 4, or 8.

In this embodiment, a UE reports a priority set, so that an eNB can configure a proper reference signal for the UE, and the UE can acquire a good channel condition. In addition, in this embodiment, the UE selects the priority set from a candidate set, so that a size of the candidate set can be restricted, thereby effectively reducing implementation complexity of measurement of the UE. Moreover, in this embodiment, the UE feeds back the priority set, and a size of the priority set can be restricted, thereby effectively reducing a feedback overhead of the UE.

Figure 8:
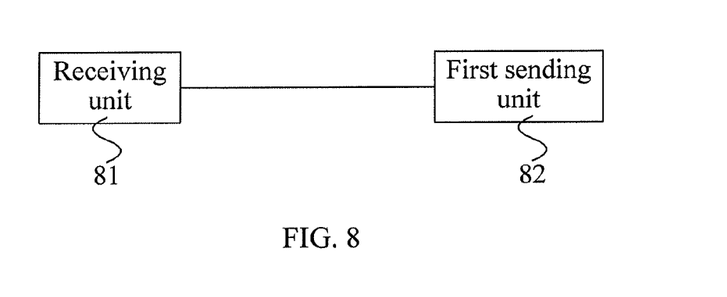
FIG. 8 is a schematic structural diagram of an eNB according to an embodiment of the present invention.

FIG. 8 is a schematic structural diagram of an eNB according to an embodiment of the present invention, which includes a receiving unit 81 and a first sending unit 82. The receiving unit 81 is configured to receive information of a reference signal configuration priority set, where the information of the reference signal configuration priority set is sent by a UE. The first sending unit 82 is configured to perform configuration on a reference signal configuration measurement set according to the information of the reference signal configuration priority set, and send the reference signal configuration measurement set to the UE, where the reference signal configuration measurement set is used for the UE to measure and feed back channel state information.

Further, the eNB may further include: a second sending unit, configured to send a reference signal configuration candidate set to the UE, so that the UE determines the reference signal configuration priority set according to the reference signal configuration candidate set.

Further, the numbers of ports of reference signal configurations included in the reference signal configuration candidate set that is sent by the second sending unit are the same.

Further, the reference signal configuration candidate set sent by the second sending unit includes: reference signal configurations having a same cell identifier, where resources occupied by the reference signal configurations having the same cell identifier do not overlap each other.

The information of the reference signal configuration priority set received by the receiving unit may include: a reference signal configuration included in the reference signal configuration priority set; a reference signal configuration included in the reference signal configuration priority set and metric information corresponding to the reference signal configuration; a reference signal configuration included in the reference signal configuration priority set, metric information corresponding to a specified reference signal configuration, and difference metric information between metric information corresponding to another reference signal configuration and the metric information corresponding to the specified reference signal configuration; or a reference signal configuration included in the reference signal configuration priority set and difference metric information between metric information corresponding to reference signal configurations.

Further, the reference signal configuration included in the information of the reference signal configuration priority set is sequential, where the information of the reference signal configuration priority set is received by the receiving unit.

The reference signal configuration measurement set sent by the first sending unit may be the same as the reference signal configuration priority set; or the reference signal configuration measurement set sent by the first sending unit is a subset of the reference signal configuration priority set; or the reference signal configuration measurement set sent by the first sending unit includes a reference signal configuration obtained by combining reference signal configurations in the reference signal configuration priority set; or the reference signal configuration measurement set sent by the first sending unit includes a port subset of a reference signal configuration in the reference signal configuration priority set.

Further, a resource occupied by the reference signal configuration that is obtained after combination and is included in the reference signal configuration measurement set sent by the first sending unit is the same as a sum of resources occupied by at least two reference signal configurations before combination, where the resource includes: a time resource, a frequency resource, a sequence resource, or an OCC resource; or a resource occupied by the port subset included in the reference signal configuration measurement set sent by the first sending unit is a part of all of a resource occupied by one reference signal configuration, where the resource includes: a time resource, a frequency resource, a sequence resource, or an OCC resource.

The foregoing metric information may include at least one of the following items: an RSRP, RSRQ, an RSSI, or path loss.

The foregoing eNB may be located at a macro base station or may be located at an RRH.

In this embodiment, a UE reports a priority set, so that an eNB can configure a proper reference signal for the UE, and the UE can acquire a good channel condition. In addition, in this embodiment, the UE selects the priority set from a candidate set, so that a size of the candidate set can be restricted, thereby effectively reducing implementation complexity of measurement of the UE. Moreover, in this embodiment, the UE feeds back the priority set, and a size of the priority set can be restricted, thereby effectively reducing a feedback overhead of the UE. This embodiment is applicable to a scenario of a CSI RS configuration.

It may be understood that cross-reference may be made to relevant features in the foregoing method and apparatus.

Persons of ordinary skill in the art may understand that, all or a part of the steps of the foregoing method embodiments may be implemented by a program instructing relevant hardware. The foregoing program may be stored in a computer readable storage medium. When the program runs, the steps of the foregoing method embodiments are performed. The foregoing storage medium includes various mediums capable of storing program codes, such as a ROM, a RAM, a magnetic disk, or an optical disc.

Finally, it should be noted that the foregoing embodiments are merely intended for describing the technical solutions of the present invention rather than limiting the present invention. Although the present invention is described in detail with reference to the foregoing embodiments, persons of ordinary skill in the art should understand that they may still make modifications to the technical solutions described in the foregoing embodiments, or make equivalent replacements to some technical features thereof; however, these modifications or replacements do not make the essence of corresponding technical solutions depart from the spirit and scope of the technical solutions in the embodiments of the present invention.

What is claimed is:

1. A method for configuring a reference signal, comprising:
   determining, by a user equipment (UE), a reference signal configuration priority set, and sending information of the reference signal configuration priority set to an evolved node B (eNB),
   wherein before the determining of the reference signal configuration priority set, comprises:
   acquiring, by the UE, a reference signal configuration candidate set, wherein a number of ports in the reference signal configurations priority set comprised in the reference signal configuration candidate set includes:

multiple reference signal configurations, and
a number of ports of a reference signal configuration in the reference signal configuration candidate set, wherein the number of ports of the reference signal configuration is the same as a number of ports of anyone of other reference signal configurations in the reference signal configuration candidate set;
measuring metric information corresponding to each reference signal configuration in the reference signal configuration candidate set in order to determine the reference signal configuration priority set; and
receiving, by the UE, a reference signal configuration measurement set sent by the eNB, wherein the reference signal configuration measurement set is configured by the eNB according to the information of the reference signal configuration priority set, and the reference signal configuration measurement set is used by the UE to measure and feed back channel state information.

2. The method according to claim 1, wherein the determining of the reference signal configuration priority set from the acquired reference signal configuration candidate set, comprises:
determining a number of reference signal configurations comprised in the reference signal configuration priority set; and
sequentially selecting reference signal configurations of the number from the reference signal configuration candidate set according to the metric information, so as to form the reference signal configuration priority set.

3. The method according to claim 2, wherein the determining of the number of reference signal configurations comprised in the reference signal configuration priority set, comprises:
determining, according to the number of reference signal configurations comprised in the reference signal configuration candidate set and an implicit correspondence between the number of the reference signal configurations comprised in the reference signal candidate set and the number of the reference signal configurations comprised in the reference signal configuration priority set, the number of the reference signal configurations comprised in the reference signal configuration priority set;
or,
receiving a notification message sent by the eNB, wherein the notification message carries the number of the reference signal configurations comprised in the reference signal configuration priority set.

4. The method according to claim 1, wherein
the reference signal configuration measurement set being the same as the reference signal configuration priority set; or
the reference signal configuration measurement set being a subset of the reference signal configuration priority set; or
the reference signal configuration measurement set comprises a reference signal configuration obtained by combining reference signal configurations in the reference signal configuration priority set; or
the reference signal configuration measurement set comprises a port subset of a reference signal configuration in the reference signal configuration priority set.

5. A method for configuring a reference signal, comprising:
sending by an evolved node B (eNB), metric information corresponding to each reference signal configuration comprised in a reference signal configuration candidate set to a user equipment (UE), in order that the metric information corresponding to each reference signal configuration in the reference signal configuration candidate set are measured by the UE to determine a reference signal configuration priority set;
receiving, by the eNB, information of the reference signal configuration priority set, wherein a number of ports in the reference signal configurations priority set comprised in the reference signal configuration candidate set includes:
multiple reference signal configurations, and
a number of ports of a reference signal configuration in the reference signal configuration candidate set, wherein the number of ports of the reference signal configuration is the same as a number of ports of anyone of other reference configurations in the reference signal configuration candidate set; and
configuring, by the eNB, a reference signal configuration measurement set according to the information of the reference signal configuration priority set, and sending the reference signal configuration measurement set to the UE, wherein the reference signal configuration measurement set is used for the UE to measure and feed back channel state information.

6. The method according to claim 5, wherein
the reference signal configuration measurement set is the same as the reference signal configuration priority set; or
the reference signal configuration measurement set is a subset of the reference signal configuration priority set; or
the reference signal configuration measurement set comprises a reference signal configuration obtained by combining reference signal configurations in the reference signal configuration priority set; or
the reference signal configuration measurement set comprises a port subset of a reference signal configuration in the reference signal configuration priority set.

7. A user equipment (UE), comprising at least a processor which executes program codes stored in a memory, which configure the UE to:
determine a reference signal configuration priority set, and send information of the reference signal configuration priority set to an evolved node B (eNB), wherein before the determining of the reference signal configuration priority set,
acquire a reference signal configuration candidate set from the eNB, wherein a number of ports in the reference signal configurations priority set comprised in the reference signal configuration candidate set includes:
multiple reference signal configurations, and
a number of ports of a reference signal configuration in the reference signal configuration candidate set, wherein the number of ports of the reference signal configuration is the same as a number of ports of anyone of other reference signal configurations in the reference signal configuration candidate set;
measure metric information corresponding to each reference signal configuration in the reference signal configuration candidate set in order to determine the reference signal configuration priority set; and receive a reference signal configuration measurement set sent by the eNB, wherein the reference signal configuration measurement set is configured by the eNB according to the information of the reference signal configuration priority set, and the reference signal configuration measurement set is used by the UE to measure and feed back channel state information.

8. The UE according to claim 7, wherein the reference signal configuration measurement set is the same as the reference signal configuration priority set; or the reference signal configuration measurement set is a subset of the reference signal configuration priority set; or the reference signal configuration measurement set comprises a reference signal configuration obtained by combining reference signal configurations in the reference signal configuration priority set; or the reference signal configuration measurement set comprises a port subset of a reference signal configuration in the reference signal configuration priority set.

9. An evolved node B (eNB), comprising at least a processor which executes program codes stored in a memory, which configure the eNB to:

send metric information corresponding to each reference signal configuration comprised in a reference signal configuration candidate set to a user equipment (UE), in order that the metric information corresponding to each reference signal configuration in the reference signal configuration candidate set are measured by the UE to determine a reference signal configuration priority set;

receive information of the reference signal configuration priority set, wherein the information of the reference signal configuration priority set is sent by the user equipment UE, wherein a number of ports in the reference signal configurations priority set comprised in a reference signal configuration candidate set includes:

multiple reference signal configurations, and a number of sorts of a reference signal configuration in the reference signal configuration candidate set, wherein the number of ports of the reference signal configuration is the same as a number of ports of anyone of other reference signal configurations in the reference signal configuration candidate set; and perform configuration on a reference signal configuration measurement set according to the information of the reference signal configuration priority set, and send the reference signal configuration measurement set to the UE, wherein the reference signal configuration measurement set is used for the UE to measure and feed back channel state information.

10. The eNB according claim 9, wherein the information of the reference signal configuration priority set comprises: a reference signal configuration comprised in the reference signal configuration priority set; a reference signal configuration comprised in the reference signal configuration priority set and the metric information corresponding to the reference signal configuration; a reference signal configuration comprised in the reference signal configuration priority set, metric information corresponding to a specified reference signal configuration in the reference signal configuration priority set, and difference metric information between metric information corresponding to another reference signal configuration in the reference signal configuration priority set and the metric information corresponding to the specified reference signal configuration; or a reference signal configuration comprised in the reference signal configuration priority set and difference metric information between metric information corresponding to reference signal configurations.

11. The eNB according to claim 10, wherein each reference signal configuration comprised in the information of the reference signal configuration priority set is sequential.

12. The eNB according to claim 9, wherein the reference signal configuration measurement set is the same as the reference signal configuration priority set; or the reference signal configuration measurement set is a subset of the reference signal configuration priority set; or the reference signal configuration measurement set comprises a reference signal configuration obtained by combining reference signal configurations in the reference signal configuration priority set; or the reference signal configuration measurement set comprises a port subset of a reference signal configuration in the reference signal configuration priority set.

* * * * *